United States Patent [19]

Barth

[11] Patent Number: 4,638,389
[45] Date of Patent: Jan. 20, 1987

[54] CONTROL PANEL FOR A TAPE RECORDER

[75] Inventor: Rüdiger Barth, Insel Reichenau, Fed. Rep. of Germany

[73] Assignee: Licentia Patent-Verwaltungs-GmbH, Fed. Rep. of Germany

[21] Appl. No.: 816,717

[22] Filed: Jan. 7, 1986

[30] Foreign Application Priority Data

Jan. 10, 1985 [DE] Fed. Rep. of Germany ....... 3500540

[51] Int. Cl.⁴ .............................................. G11B 15/18
[52] U.S. Cl. ................................... 360/72.1; 360/74.1; 360/137
[58] Field of Search ....................... 360/72.1, 74.1, 137

Primary Examiner—George G. Stellar
Attorney, Agent, or Firm—McGlew and Tuttle

[57] ABSTRACT

A control panel for a tape recorder includes wind and rewind buttons, recording button, a playback button and a stop button. On actuation of the recording button or of the playback button, the respective tape position is automatically stored in a main memory. Under the stop button a location button is arranged. On actuation of the location button the magnetic tape is stopped, the tape location stored in the memory is read, and the tape rewound to this tape location. On a simultaneous actuation of the locations button and of the stop button, the tape is stopped and rewound to the tape location "zero". On simultaneous actuation of the location button and of the playback button, the tape is stopped, the tape location stored in the memory is read, the tape is rewound to this tape location, and in automatic repeat played back between this tape location and the stopped location.

2 Claims, 2 Drawing Figures

CONTROL PANEL FOR A TAPE RECORDER

FIELD AND BACKGROUND OF THE INVENTION

This invention relates in general to tape recorders and in particular to a new and useful control panel for a taper recorder.

In commercial radio or television and in music production, a studio tape recorder is a tool which, besides the basic requirement of ensuring top quality sound recording, sets stringent requirements for each handling. By definition of his task, the sound engineer should concentrate on the correctness and quality of the recording and not on the operation of the equipment.

SUMMARY OF THE INVENTION

The invention provides a control panel for tape recorders which saves the operator manipulations and reduces the demands on concentration during operation.

The present invention provides an improved recorder control panel with a plurality of buttons which when actuated will cause responsive means carried in the recorder to execute various operations such as locating the respective tape and automatically storing it in a main memory, stopping the magnetic tape, storing the magnetic tape in the memory and reading the magnetic tape, and rewinding the magnetic tape to a location, playing back at the location stored in the memory and automatic repetition of the playback of the tape.

In accordance with the invention, the operating buttons for the recorder are located in the most desirable and easily operable base and relative locations for effecting operation in a simple manner.

Accordingly it is an object of the invention to provide an improved tape recorder control panel.

A further object of the invention is to provide a tape recorder control panel which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figures 1, 2:
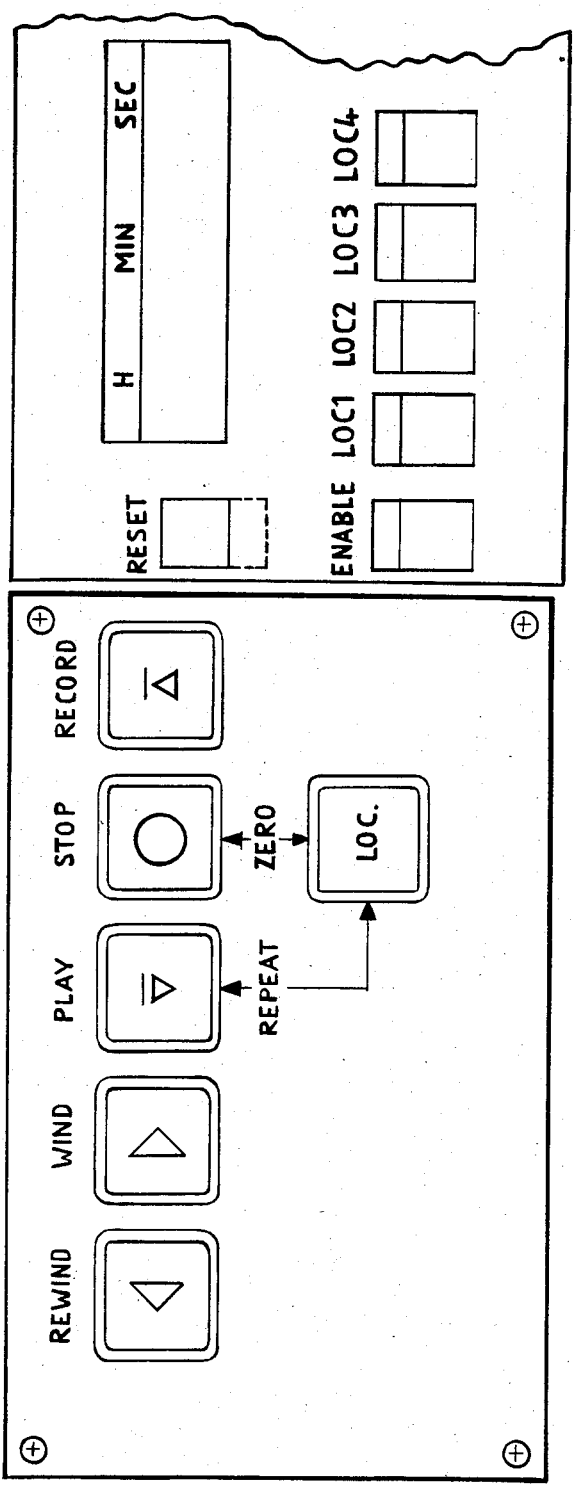
FIG. 1 is a top plan view of a control panel for a tape recorder constructed in accordance with the invention.
FIG. 2 is a partial view similar to FIG. 1 of another embodiment of the invention.

In the following, the invention will be explained more specifically in reference to the figure. The figure shows essentially only the control elements of significance for the invention. All other functions have been omitted for the sake of simplicity. The operation of this tape recorder is divided into three groups:

1. Pure drive operation (rewinding, playback, recording, stop)
2. Function determination of the total machine (speed selection, distortion correction switching, splicing, counter variospeed, etc.)
3. Function determination related to the tracks (recording standby switching, sync operation, switching to input).

In all studio tape recorders the button arrangement for the drive is characterized by large buttons easy to operate. According to the invention there is associated with this panel a location button marked LOC (locate), namely in an ergonomically meaningful manner under the stop button (STOP), as shown in the figure. At each Play command or Record command, the respective tape location is stored in memory. Upon actuation of the Locate button, a Stop and Rewind command is generated, which is at the same time a search function for the last stored tape location. The tape is rewound to this tape location.

At simultaneous actuation of the location button LOC and of the stop button, the tape is stopped and rewound to the zero position.

At simultaneous operation of the location button LOC and of the playback button PLAY, the tape recorder is stopped, rewound, and then runs in automatic repeat between the last start location and the stop location.

The linking of the functions to achieve the features of the invention can be done by simple logic circuits or with a microprocessor. Both is familiar to the specialist and therefore need not be explained further here.

It is known how to store and locate tape locations, to approach the zero position, or automatically to repeat the playback by the actuation of separate buttons with the designations SET CUE, LOCATE CUE, LOCATE ZERO, REPEAT. The location button LOC according to the invention eliminates the need for these four buttons. By its ergonomically favorable arrangement under the stop button it is possible to actuate with one manipulation several functions for which according to prior art several buttons, lying far apart, had to be operated.

In a development of the invention, also several location storing buttons LOC1 to LOC4 are provided, as well as a release button ENABLE spatially directly associated with them. Upon actuation of one of the buttons LOC1 to LOC4, the tape location just reached is stored. Upon simultaneous actuations of one of the four buttons and of the ENABLE button, the tape is stopped and the respective stored tape location approached.

While a specific embodiment of the invention has been shown and described in detail to illustrate the application of the principles of the invention, it will be understood that the invention may be embodied otherwise without departing from such principles.

What is claimed is:

1. A control panel for a magnetic tape recorder comprising a main memory associated with said recorder, and wind, rewind, recording, playback, location, and stop buttons, and button responsive means for carrying out the designations indicated by the buttons, and wherein on actuating one of the recording buttons (RECORD) and the playback button (PLAY) the respective tape location is automatically stored in said main memory by said button responsive means;

under said stop buttton designated (STOP) said location button designated (LOC) is arranged;

on actuating said location button (LOC), the magnetic tape is stopped, the tape locations stored in the main memory is read, and the magnetic tape is rewound to this tape location by said button responsive means;

on simultaneous actuation of the location button (LOC) and of this stop button (STOP), the magnetic tape is stopped and rewound to the tape location zero by said button responsive means;

on simultaneous actuation of the location button (LOC) and of the playback button (PLAY), the magnetic tape is stopped, the tape location reached is stored as per "take" end, the magnetic tape is rewound to the last recording or playback location stored in the memory, and in automatic repetition played back between the tape location the stopped location by said button responsive means.

2. A control panel according to claim 1, including a plurality of location buttons designated (LOC 1, LOC 2, etc. up to LOC 4) and a release button (ENABLE) is spatially directly associated therewith; and upon actuation of one of the location storing buttons (LOC 1 to LOC 4) the respective reached tape location is stored; and on actuation of one of the location storing buttons LOC 1 to LOC 4) and on the release actuation of the release button (ENABLE), the magnetic tape is stopped and rewound to the respective stored tape location.

* * * * *